United States Patent
Takagi

(10) Patent No.: US 8,315,801 B2
(45) Date of Patent: Nov. 20, 2012

(54) INFORMATION TERMINAL DEVICE, METHOD FOR CONTROLLING INFORMATION TERMINAL DEVICE, RECORDING MEDIUM ON WHICH PROGRAM FOR CONTROLLING INFORMATION TERMINAL DEVICE IS RECORDED, AND COMMUNICATION NETWORK

(75) Inventor: Tetsuo Takagi, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 925 days.

(21) Appl. No.: 12/281,737

(22) PCT Filed: Feb. 20, 2007

(86) PCT No.: PCT/JP2007/053080
§ 371 (c)(1),
(2), (4) Date: Jan. 9, 2009

(87) PCT Pub. No.: WO2007/102309
PCT Pub. Date: Sep. 13, 2007

(65) Prior Publication Data
US 2009/0198442 A1    Aug. 6, 2009

(30) Foreign Application Priority Data
Mar. 7, 2006  (JP) ................ P2006-061587

(51) Int. Cl.
*G01C 21/36* (2006.01)
(52) U.S. Cl. ................. 701/533; 340/995.19
(58) Field of Classification Search ............. 701/201, 701/200, 208, 209, 211, 408–410, 418, 421, 701/433, 436, 533; 345/633, 418, 419, 6; 340/995.19, 995.2
See application file for complete search history.

(56) References Cited

U.S. PATENT DOCUMENTS

| | | | | |
|---|---|---|---|---|
| 6,151,552 A * | 11/2000 | Koizumi et al. | ............ | 701/211 |
| 6,421,606 B1 * | 7/2002 | Asai et al. | ............ | 701/209 |
| 6,493,630 B2 * | 12/2002 | Ruiz et al. | ............ | 701/208 |
| 6,728,636 B2 * | 4/2004 | Kokojima et al. | ............ | 701/211 |
| 7,286,931 B2 * | 10/2007 | Kawasaki | ............ | 701/209 |
| 7,957,871 B1 * | 6/2011 | Echeruo | ............ | 701/54 |
| 2003/0060978 A1 | 3/2003 | Kokojima et al. | | |
| 2003/0142115 A1 * | 7/2003 | Endo et al. | ............ | 345/633 |
| 2004/0193365 A1 | 9/2004 | Kokojima et al. | | |

FOREIGN PATENT DOCUMENTS

| | | | |
|---|---|---|---|
| JP | 2001-004384 A | | 1/2001 |
| JP | 2001-343892 A | | 12/2001 |
| JP | 2002-357438 A | | 12/2002 |
| JP | 2003-172632 A | | 6/2003 |
| JP | 2003-182578 A | | 7/2003 |
| JP | 2004-069423 | * | 3/2004 |
| JP | 2004-069423 A | | 3/2004 |
| JP | 2005-070658 A | | 3/2005 |
| WO | 02/23128 A1 | | 3/2002 |

* cited by examiner

*Primary Examiner* — Thomas Black
*Assistant Examiner* — Marthe Marc-Coleman
(74) *Attorney, Agent, or Firm* — Sughrue Mion, PLLC

(57) ABSTRACT

An information terminal device that clearly displays routes and directions to be taken is provided. A method for controlling the information terminal device, a program for controlling the information terminal device, a recording medium on which the program for controlling the information terminal device is recorded, and a communication network are also provided. An information terminal device displays surrounding area information including a display of the destination and a symbol representing the street leading to the destination from an exit of the nearest station, and image information formed by adding an arrow representing the direction toward the destination to a photograph of the street leading to the destination from the exit of the nearest station.

4 Claims, 7 Drawing Sheets

INFORMATION TERMINAL DEVICE, METHOD FOR CONTROLLING INFORMATION TERMINAL DEVICE, RECORDING MEDIUM ON WHICH PROGRAM FOR CONTROLLING INFORMATION TERMINAL DEVICE IS RECORDED, AND COMMUNICATION NETWORK

FIELD OF THE INVENTION

The present invention relates to the field of information terminal devices such as portable navigation devices.

BACKGROUND OF THE INVENTION

An example of a conventional portable navigation device is a device disclosed in Patent Reference 1. A system that includes a conventional portable navigation system is formed with a portable navigation device such as a portable telephone device to display a map on its display unit, a database for storing map data and road link information necessary for route searches, a map server that carries out route searches and creates route guide maps, and a communication network that connects the portable navigation device and the map server.

Next, an operation to be performed by a conventional portable navigation device is described. When a user inputs a departure point and a destination point to the portable navigation device and issues an instruction to search for a route, the portable navigation device sends the departure point and the destination point to the map server and issues a route search request via the communication network. The map server uses the road link information stored in the database, to perform a route search. The map server then determines the total length of the links forming the searched route, and sets the total length as the distance to the destination point. The map server next uses the map data stored in the database and the route search results, to create a route guide map that includes information about the departure point, the destination point, and the route on a map. The route guide map and the distance to the destination point are transmitted to the portable navigation device via the communication network, and are then displayed on the portable navigation device.

Next, an example display of a route guide map on a conventional portable navigation device is described. For example, a JR station is set as a departure point S, and a library is set as a destination point G. The route between the departure point S and the destination point G is indicated by a thick solid line, and landmarks existing along the route are denoted by numbers such as 1, 2, and 3 on the map. Explanation of those numbers and the distance to the destination point are also displayed on the map. With this arrangement, routes can be clearly displayed even on a small screen of a conventional portable navigation device, and it is possible to know the distance to each destination point.

Patent Reference 1: Japanese Patent Application Laid-Open No. 2001-4384

DISCLOSURE OF THE INVENTION

Problems to be Solved by the Invention

In the above described conventional portable navigation device, however, only the image of the entire routes from the departure point S to the destination point G is displayed. Therefore, the display mode is limited to only one type, and the entire routes can be grasped. However, the map is displayed on a small scale, and it is difficult to determine which way to choose in a case where the shapes of the streets around the departure point S are complicated or where there is a traffic circle near the departure point S.

The present invention is to solve the above problems, and it is an object of the invention to provide an information terminal device that clearly displays routes and directions to be taken, so that users can grasp all the routes from the departure point to the destination point on a portable telephone device or the like having a display unit with a small area, even if the shapes of the streets near the departure point are complicated or even if there is a traffic circle near the departure point. It is also an object of the invention to provide a method for controlling the information terminal device, a program for controlling the information terminal device, a recording medium on which the program for controlling the information terminal device is recorded, and a communication network.

Means to Solve the Problems

An exemplary embodiment relates to an information terminal device comprising:
storing means for storing map information and image information to be displayed on the information terminal device;
input means for inputting desired destination information;
surrounding area map information extracting means for extracting surrounding area map information from the storing means, the surrounding area map information including a destination point identified by the destination information and designated spot information about at least one predetermined designated spot existing within a predetermined distance from the destination point;
destination-directed point information extracting means for extracting destination-directed point information that is included in the designated spot information about the designated spot nearest to the destination point identified by the destination information from the designated spot information about each designated spot in the surrounding area map information;
related image information extracting means for extracting related image information from the storing means, the related image information being associated with the destination-directed point information; and
displaying means for displaying the surrounding area map information including the destination information and the destination-directed point information, and the related image information.

An exemplary embodiment relates to a method for controlling an information terminal device, comprising:
a process of storing map information and image information to be displayed on the information terminal device;
a process of inputting desired destination information;
a process of extracting surrounding area map information, the surrounding area map information including a destination point identified by the destination information and designated spot information about at least one predetermined designated spot existing within a predetermined distance from the destination point;
a process of extracting destination-directed point information that is included in the designated spot information about the designated spot nearest to the destination point identified by the destination information from the designated spot information about each designated spot in the surrounding area map information;

a process of extracting related image information, the related image information being associated with the destination-directed point information; and a process of displaying the surrounding area map information including the destination information and the destination-directed point information, and the related image information.

an exemplary embodiment relates to a program for controlling an information terminal device, the program causing a computer in the information terminal device to function as:

storing means for storing map information and image information to be displayed on the information terminal device;

input means for inputting desired destination information;

surrounding area map information extracting means for extracting surrounding area map information from the storing means, the surrounding area map information including a destination point identified by the destination information and designated spot information about at least one predetermined designated spot existing within a predetermined distance from the destination point;

destination-directed point information extracting means for extracting destination-directed point information that is included in the designated spot information about the designated spot nearest to the destination point identified by the destination information from the designated spot information about each designated spot in the surrounding area map information;

related image information extracting means for extracting related image information from the storing means, the related image information being associated with the destination-directed point information; and displaying means for displaying the surrounding area map information including the destination information and the destination-directed point information, and the related image information.

Figure 1:
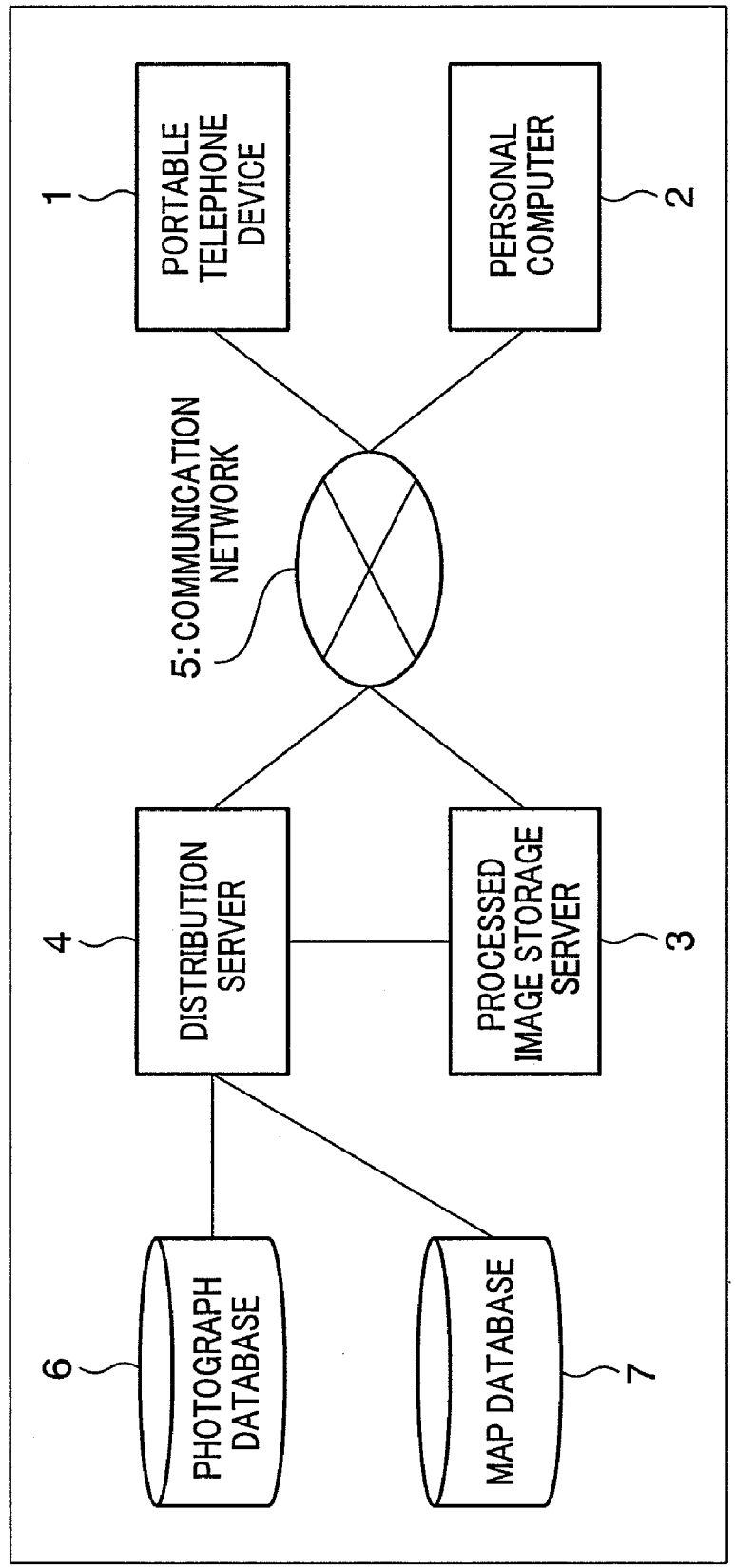
FIG. 1 shows an example of a structure of a system that includes a portable telephone device as an information terminal device in accordance with an embodiment of the present invention.

EXPLANATION OF REFERENCE NUMERALS 1 portable telephone device
2 personal computer
3 processed image server
4 distribution server
5 communication network
6 photograph database
7 map database

PREFERRED EMBODIMENTS FOR CARRYING OUT THE INVENTION

Figure 2A:
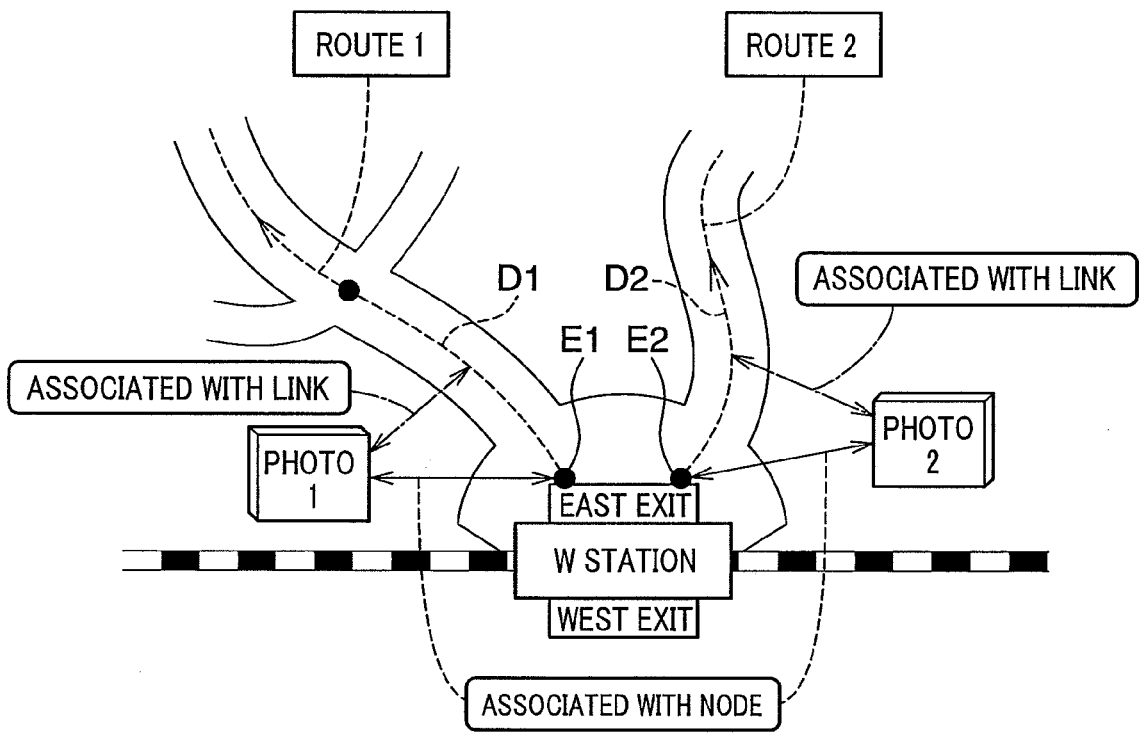
FIG. 2A shows the relationship between photographs taken at an exit of a station and route information or node information in accordance with an embodiment.
Figure 2B:
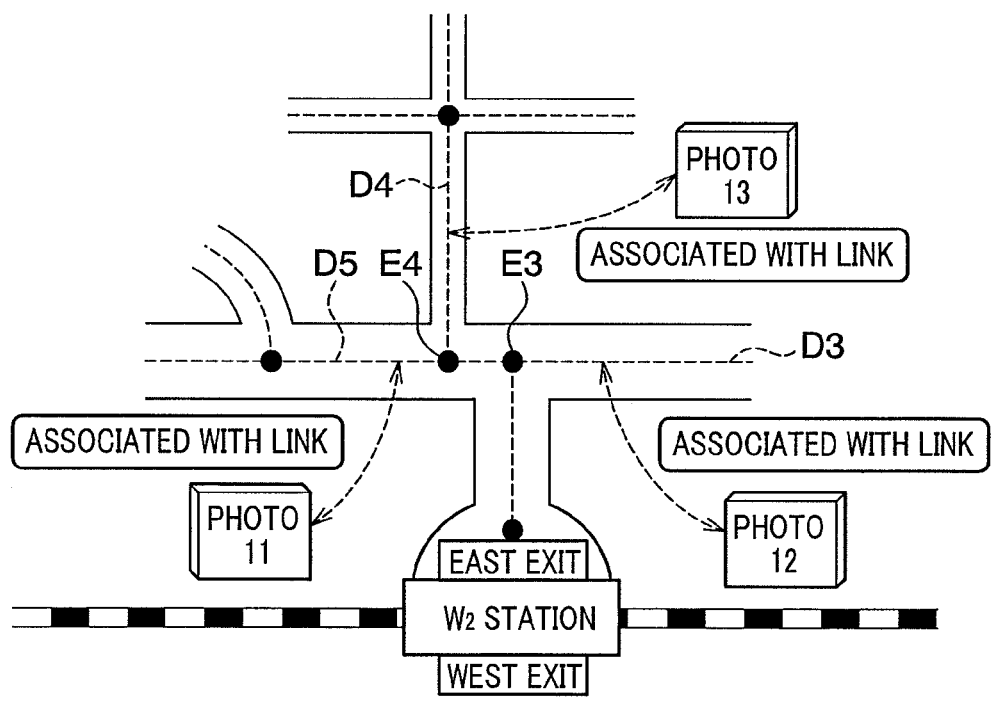
FIG. 2B shows the relationship between photographs taken at intersections and route information or node information in accordance with an embodiment.
Figure 3:
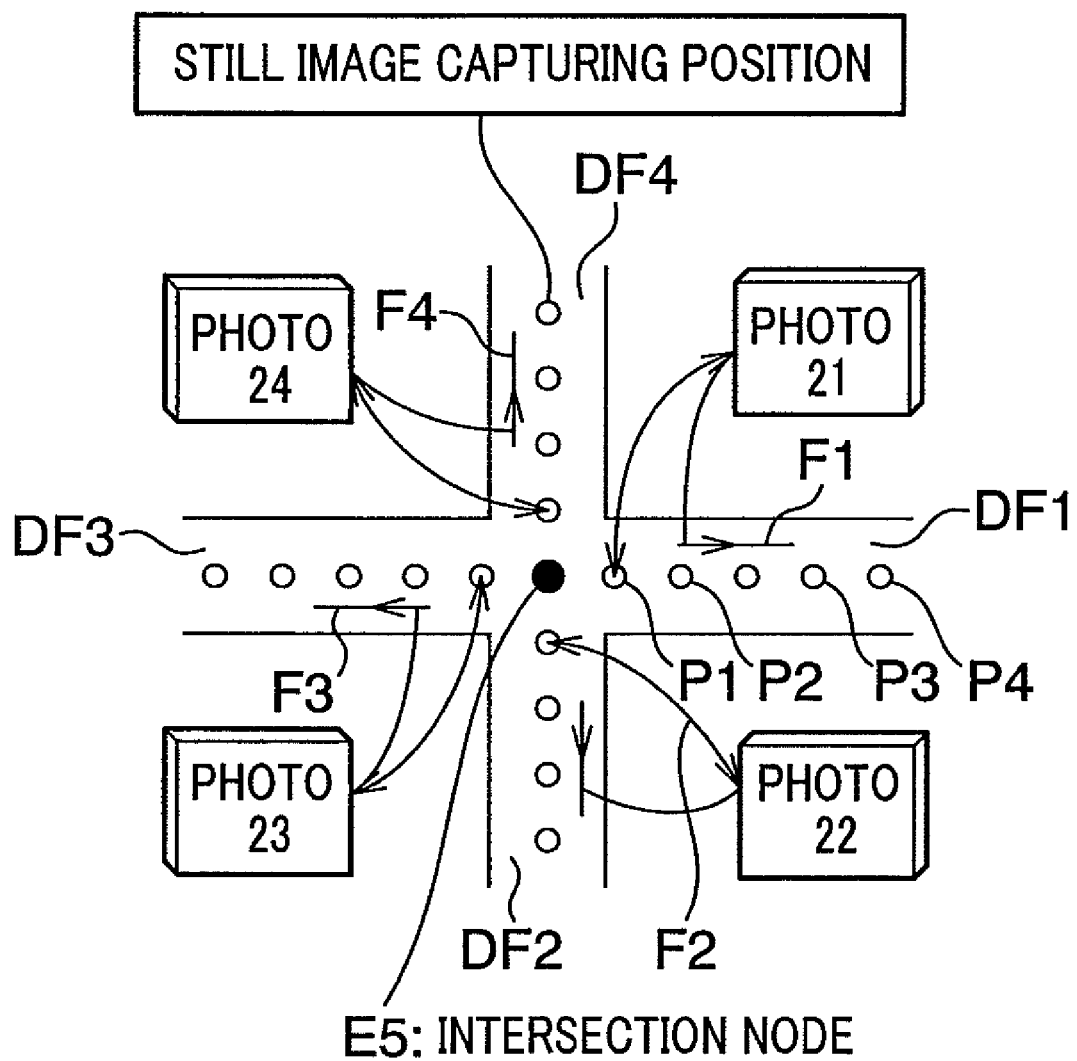
FIG. 3 shows the relationship between photographs taken at an intersection and node information in accordance with an embodiment.
Figure 4A:
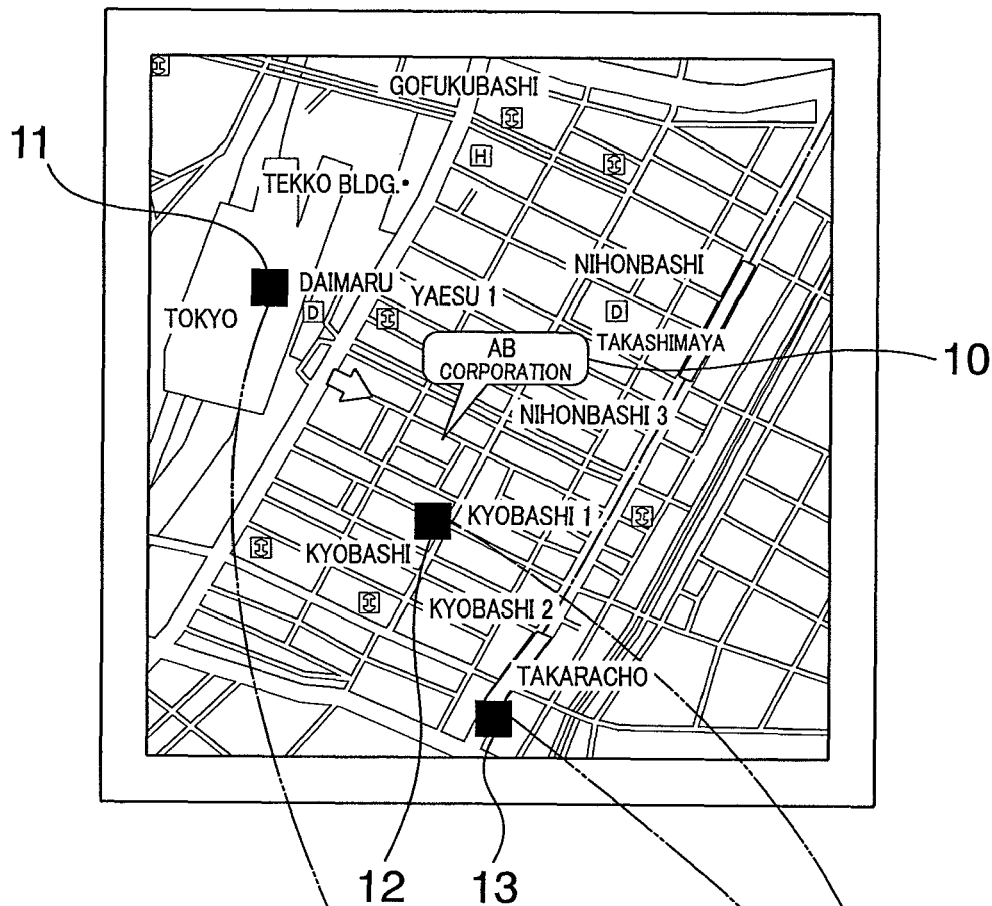
FIG. 4A shows an example of surrounding area information to be displayed on the information terminal device in accordance with an embodiment.
Figure 4B:
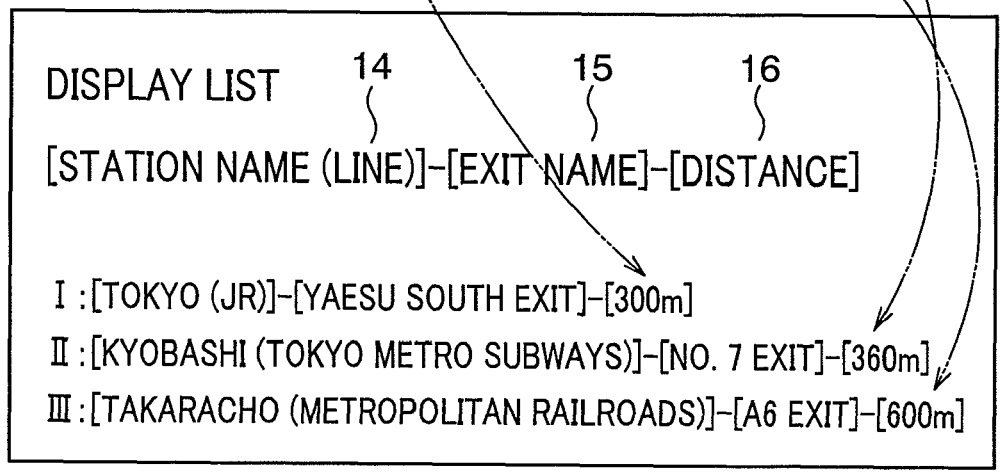
FIG. 4B shows an example of a list of the exits of the nearest stations to be displayed on the information terminal device in accordance with an embodiment.
Figure 5A:
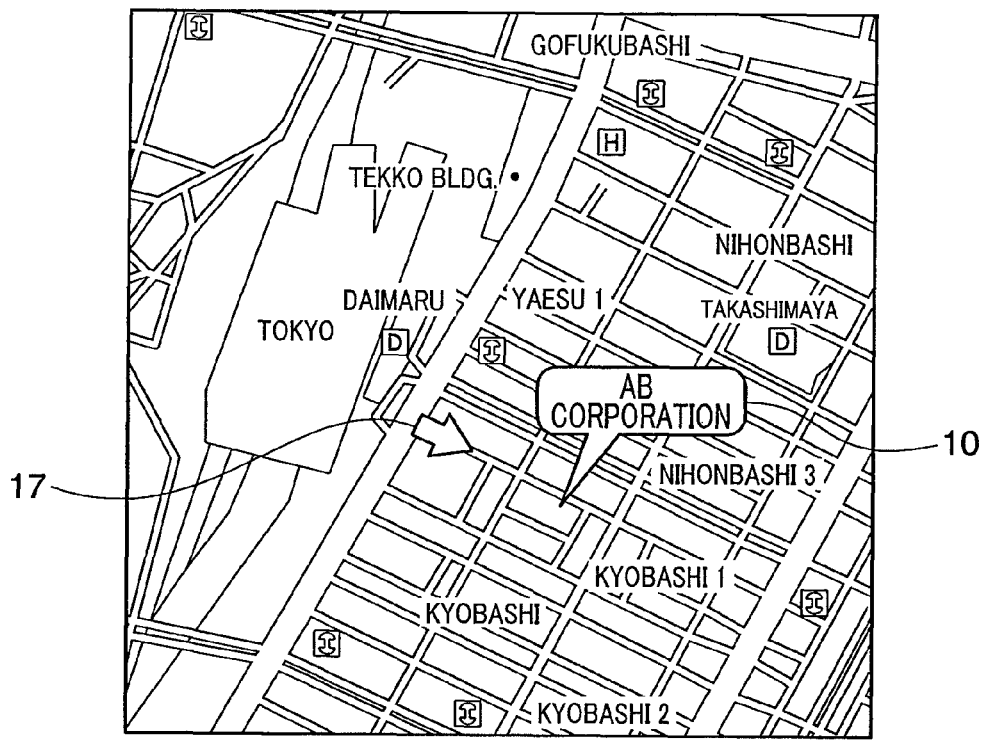
FIG. 5A shows the surrounding area information that indicates a destination and a symbol pointing out the streets leading to the destination from an exit of the nearest station in accordance with an embodiment.
Figure 5B:
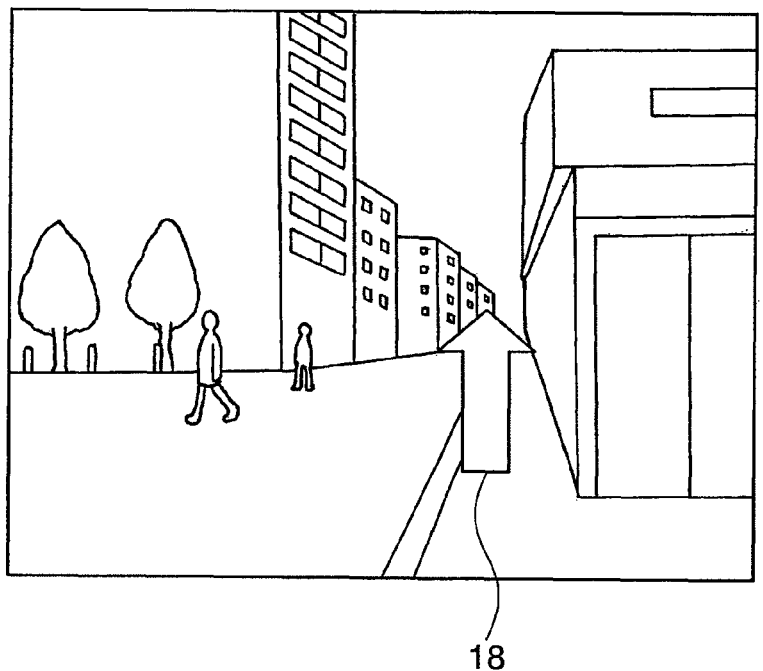
FIG. 5B shows image information that is a photograph of the street leading to the destination from an exit of the nearest station, with an arrow indicating the direction toward the destination being added onto the street in accordance with an embodiment.
Figure 6:
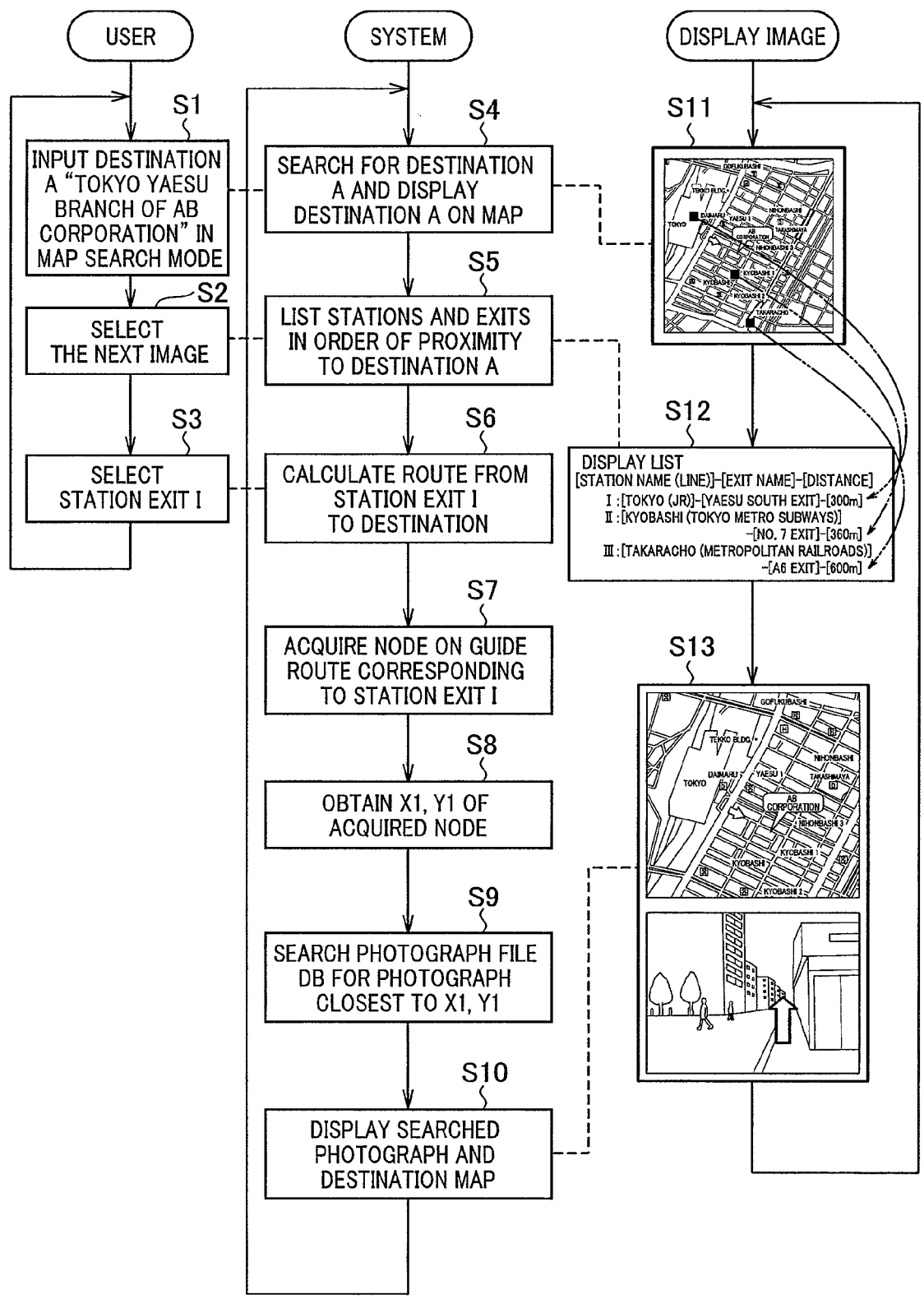
FIG. 6 is a flowchart showing operations of the information terminal device, the distribution server, and the display unit of the information terminal device in accordance with an embodiment.
Figure 7A:
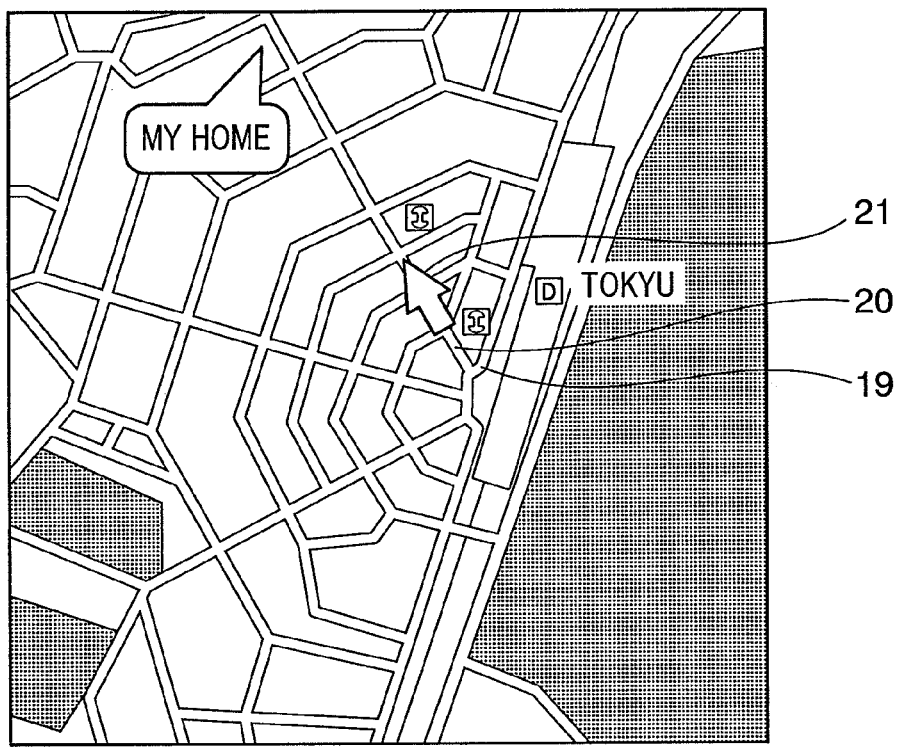
FIG. 7A shows the surrounding area information that indicates a destination and a symbol pointing out the streets leading to the destination from an exit of the nearest station in accordance with an embodiment.
Figure 7B:
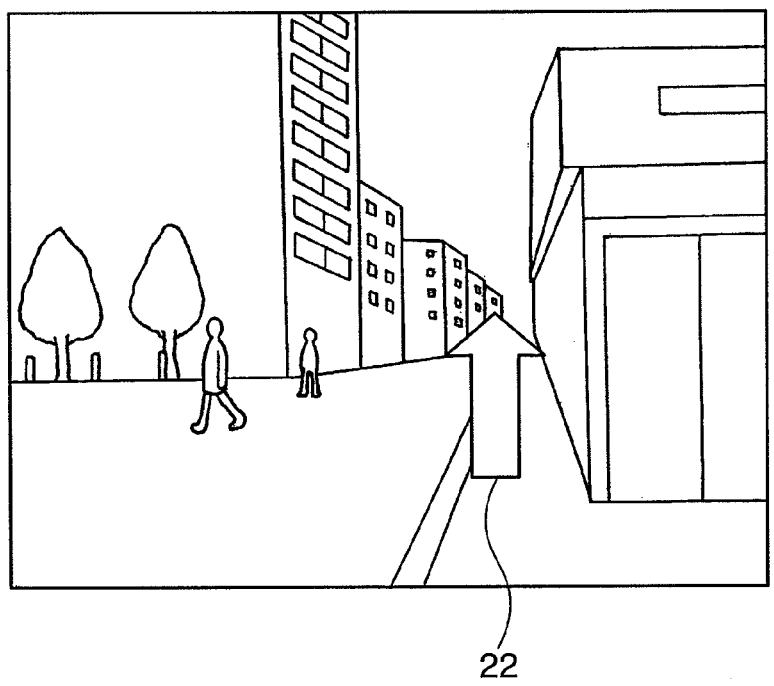
FIG. 7B shows image information that is a photograph of the street leading to the destination from an exit of the nearest station, with an arrow indicating the direction toward the destination being added onto the street in accordance with an embodiment.

Referring to FIGS. 1 through 7B, preferred embodiments of the present invention are described. FIG. 1 illustrates an example of a structure of a system including a portable telephone device as an information terminal device in accordance with this embodiment. FIG. 2A shows the relationship between photographs taken at an exit of a station and route information or node information in accordance with an embodiment. FIG. 2B shows the relationship between photographs taken at intersections and route information or node information in accordance with an embodiment. FIG. 3 shows the relationship between photographs taken at an intersection and node information in accordance with an embodiment. FIG. 4A shows an example of surrounding area information to be displayed on the information terminal device in accordance with an embodiment. FIG. 4B shows an example of a list of the exits of the nearest stations to be displayed on the information terminal device in accordance with an embodiment. FIG. 5A shows the surrounding area information that indicates a destination and a symbol pointing out the streets leading to the destination from an exit of the nearest station in accordance with an embodiment. FIG. 5B shows image information that is a photograph of the street leading to the destination from an exit of the nearest station, with an arrow indicating the direction toward the destination being added onto the street in accordance with an embodiment. FIG. 6 is a flowchart showing operations of the information terminal device, the distribution server, and the display unit of the information terminal device in accordance with an embodiment. FIG. 7A shows another example of the surrounding area information that indicates a destination and a symbol pointing out the streets leading to the destination from an exit of the nearest station in accordance with an embodiment. FIG. 7B shows another example of image information that is a photograph of the street leading to the destination from an exit of the nearest station, with an arrow indicating the direction toward the destination being added onto the street in accordance with an embodiment.

Referring first to FIG. 1, an example of a structure of a system that includes a portable telephone device as an information terminal device in accordance with this embodiment is described.

As shown in FIG. 1, the system includes: a portable telephone device 1 and a personal computer 2 as information terminal devices that display information such as a map on their display units; a map database 7 that stores map data and road link information necessary for searching for routes; a photograph database 6 that stores photograph information as to roads associated with the road link information, intersection node information, and the likes; a distribution server 4 that creates processed image information and the likes by combining a route search and a route guide map with photograph information associated with the rouge guide map based on the photograph information contained in the route guide map and the photograph database 6; a processed image storage server 3 that stores the processed image information created by the distribution server 4; and a communication network 5 that connects the portable navigation device 1, the personal computer 2, the distribution server 4, and the processed image storage server 3.

The portable telephone device 1 and the personal computer 2 each includes: a controller (not shown) that controls the entire device; a storage unit (not shown) that stores the points of departures, destinations, and maps; a display unit (not shown) that displays a map and the likes; a communication unit (not shown) that performs communications; a communication antenna (not shown); and an input unit designed for users to perform operations.

Next, operations of the portable telephone device 1 and the personal computer 2 are described. When a user operates the input unit to input a destination, the input destination is stored in a memory. The destination is identified by the latitude and longitude, telephone number, name, and the likes. After the destination is set, the user operates the input unit to issue an instruction to search for a route, the controller of the portable telephone device 1 or the personal computer 2 extracts the departure and destination information from a memory, and sends a route search request to the distribution server 4 with respect to the destination, via the communication unit, the communication antenna, and the communication network 5.

The controller of the portable telephone device 1 or the personal computer 2 also causes the display unit to display information transmitted from the distribution server 4 or the processed image storage server 3 via the communication network 5, the communication antenna, and the communication unit. The user then operates the input unit of the portable telephone device 1 or the personal computer 2, so as to select one of the types of information displayed on the display unit. The controller of the portable telephone device 1 or the personal computer 2 stores the received information into the storage unit.

Next, the photograph database 6 is described.

The photograph database 6 stores information as to photographs taken at various places such as the entrances and exits of stations of the JR lines, private railroads, Tokyo metropolitan railroads, and Tokyo Metro subways, the entrances and exits of buildings such as libraries and government offices, and the intersections of streets. The photographs in the photograph information are taken in the direction of the street continuing to each place in such a manner that the streets continuing to the respective places are captured in the photographs.

Referring now to FIG. 2A, the photograph information based on stations and stored in the photograph database 6 is described.

FIG. 2A shows W station and the fact that there are streets represented by a route 1 and a route 2 as link information about the streets extending from the east exit of W station.

FIG. 2A also shows node information indicating that there are a point E1 and a point E2 at the east exit of W station.

A photograph 1 shown in FIG. 2A is a photograph taken at the point E1 of the east exit of W station in the direction of route 1 so as to capture the street D1. When a user is at the east exit of W station and looks at the photograph 1, the user can understand that the street D1 on the route 1 is shown in the photograph 1.

Accordingly, for example, even if the user cannot find the street D1 on the route 1 though he/she must take the route 1, he/she can easily find the street D1 by looking at the photograph 1 on the display of the portable telephone 1 at the point E1.

A photograph 2 is taken at the point E2 of the east exit of W station in the direction of route 2, so that the street D2 is captured in the photograph 2. When a user is at the east exit of W station, the user can notice the street D2 on the route 2 by looking at the photograph 2.

Accordingly, for example, even if the user cannot find the street D1 on the route 1 though he/she must take the route 1, he/she can easily find the street D1 by looking at the photograph 1 on the display unit of the portable telephone 1 at the point E1.

The photograph 1 is associated with the route 1 in the link information, and is stored in the photograph database 6. The photograph 2 is associated with the route 2 in the link information, and is also stored in the photograph database 6. Accordingly, when a route search is conducted with the use of the distribution server 4, the distribution server 4 can easily extract the photograph information associated with a desired route in the link information from the photograph database 6, as will be described later.

Alternatively, the photographs may be associated with node information and be stored in the photograph database 6. More specifically, the photograph 1 is associated with the point E1 of the east exit of W station in the node information, and is stored in the photograph database 6. The photograph 2 is associated with the point E2 of the east exit of W station in the node information, and is also stored in the photograph database 6. Accordingly, when a route search is conducted with the use of the distribution server 4, the distribution server 4 can easily extract the photograph information associated with the node information as to a desired route from the photograph database 6, as will be described later.

Next, information about photographs of various streets taken at an intersection is described.

FIG. 2B shows street link information indicating that there are streets represented by a route D3 and a route D4 extending from intersection E3 as a node from the east exit of W2 station. A photograph 12 is taken at the intersection E3 in the direction of the route D3 in such a manner that the street represented by the route D3 is captured in the photograph 12. A photograph 11 is taken at intersection E4 in the direction of a route D5 in such a manner that the street represented by the route D5 is captured in the photograph 11. A photograph is taken at the intersection E4 in the direction of the route D4 in such a manner that the street represented by the route D4 is captured in the photograph 13.

The photographs 11 through 13 taken in this manner are associated with the routes D3 through D5 in route information, and are stored in the photograph database 6.

If the distribution server 4 determines that there is a destination in the direction of the route D3 from the intersection E3, the distribution server 4 extracts the route D3 and the photograph 12 associated with the route D3. If the distribution server 4 determines that there is a destination in the direction of the route D4 from the intersection E4, the distribution server 4 extracts the route D4 and the photograph 13 associated with the route D4. If the distribution server 4 determines that there is a destination in the direction of the route D5 from the intersection E4, the distribution server 4 extracts the route D5 and the photograph 11 associated with the route D5.

Accordingly, when a route search is conducted with the use of the distribution server 4, the distribution server 4 can easily extract the photograph information associated with the information about a desired route from the photograph database 6, as will be described later.

Next, information as to photographs of various streets taken at some other intersection is described.

FIG. 3 shows a photograph 21 taken at an intersection node 5 as an intersection so as to capture a street DF1 in a F1 direction, a photograph 22 taken at the intersection node 5 as an intersection so as to capture a street DF2 in a F2 direction, a photograph 23 taken at the intersection node 5 as an intersection so as to capture a street DF3 in a F3 direction, and a photograph 24 taken at the intersection node 5 as an intersection so as to capture a street DF4 in a F4 direction.

When the intersection node 5 is extracted, the photographs 21, 22, 23, and 24 associated with the intersection node 5 are extracted together with the information as to the intersection node 5.

Further, photographs are taken at predetermined intervals in the F1 direction from the intersection node 5, so as to capture the street DF1. The photographs are taken at points P1, P2, P3, and P4 on the street DF1 shown in FIG. 3, so as to capture the street DF1. Photographs taken in the F1 direction associated with the intersection node 5 can be associated with not only the photograph 21 taken at the point P1 but also the photographs taken at the points P2 through P4. If it is difficult for a user to recognize the street DF1 in the F1 direction in the photograph 21 taken at the point P1, the user can operate the input unit of the portable telephone device 1 or the personal computer 2 to select and extract the photographs of the street DF1 taken at the points P2, P3, and P4. Those photographs can be displayed on the display unit of the portable telephone device 1 or the personal computer 2 via the distribution server 4 and the communication network 5.

Next, the map database 7 is described.

The map database 7 stores street network information, street information including intersection information, building information (information about stations, buildings, parks, and the likes), railroad information including line information, river information, and the likes, all of which are associated with position coordinates.

The map database 7 can manage information about stations, buildings, intersections, parks, and the likes, as block information.

For example, the block information includes data such as the attributes of classified blocks, the connected streets in contact with the entrance and exits of the blocks, the numbers allotted to the maps in which the blocks exist, the coordinates of the blocks on the maps, the addresses of the blocks, and information as to the polygon forming the blocks.

The map database 7 also stores link data that indicates streets, and node data that indicates destination points and designated spot information (about stations, buildings, intersections, and the likes) that are input by users through the portable telephone device 1 or the personal computer 2.

When conducting a route search with the use of the street link information stored in the map database 7, the distribution server 4 determines the total length of the links forming the searched route, and sets the total length as the distance to the destination.

Next, the distribution server 4 is described.

In accordance with a route search request with respect to a destination transmitted from the portable telephone device 1 or the personal computer 2, the distribution server 4 performs a route search with the use of the street link information stored in the map database 7, and extracts the map information about the area surrounding the destination as surrounding area information from the map database 7.

The surrounding area information includes display information about markers and the likes representing buildings such as stations of the JR lines, the private railroads, the Tokyo metropolitan railroads, and the Tokyo Metro subways, libraries, and government offices, as the information about a designated spot close to the destination. The surrounding area information also includes the name of the destination. The display information including the display information such as markers and the name of the destination is created at the distribution server 4. The distance from the destination to the designated spot included in the surrounding area information is several kilometers or less.

In a case where the station or the building identified by the designated spot information has more than one entrance or exit, the distribution server 4 selects the closest one to the destination among the entrances and exits of the station or the building, and sets the selected entrance or exit as destination point direction information.

The distribution server 4 has the surrounding area information including display information such as an arrow indicating the direction from the entrance or exit closest to the destination point on a street toward the destination.

The surrounding area information including the name of the destination, the display information such as markers representing stations of the JR lines, the private railroads, the Tokyo metropolitan railroads, and the Tokyo Metro subways, libraries, government offices, and the likes as designated spot information, and the display information such as an arrow is displayed on the display unit of the portable telephone device 1 or the personal computer 2.

FIG. 4A shows an example display of surrounding area information that includes "AB corporation", which is the name of the destination, and an arrow as display information indicating the direction toward AB corporation from the Yaesu south exit of Tokyo station as destination point direction information displayed on the street on the route leading to the destination.

In FIG. 4A, reference numeral 10 indicates the location of AB corporation at the center of the screen of the display unit. Reference numeral 11 indicates a solid square symbol representing Tokyo station as the designated spot information at the upper left of AB corporation in FIG. 4A. Reference numeral 12 indicates a solid square symbol representing Kyobashi station of the Tokyo Metro subways as the designated spot information at the lower left of AB corporation. Reference numeral 13 indicates a solid square symbol representing Takaracho station of the Tokyo metropolitan railroads as the designated spot information displayed below AB corporation.

In this manner, a user refers to the surrounding area information including a destination displayed on the display unit of the portable telephone device 1 or the personal computer 2, so as to grasp the positional relationship between the destination and designated spot information such as the station nearest to the destination.

The distribution server 4 further calculates the distance from the selected station or the exit of each selected building as the destination point direction to the destination point, based on the map database stored in the map database 7. The distribution server 4 also transmits the exit information about each station and each building as the destination point direction information, and the information about the distance between the destination point and the exit of each of the stations and buildings as the destination point direction information, to the portable telephone device 1 or the personal computer 2.

The distribution server 4 also prioritizes the designated spot information contained in the surrounding area information in order of proximity to the destination, and transmits the prioritized results as priority order information to the portable telephone device 1 or the personal computer 2. When displaying the designated spot information in the form of a list on the display unit, the portable telephone device 1 or the personal computer 2 displays the designated spot information in order of proximity to the destination, based on the priority order information.

The names of the stations and the buildings as the designated spot information, the exit information about each of the stations and buildings as the destination point direction information, and the information about the distances from the exit of each of the stations and buildings to the destination point as the destination point direction information, are displayed on the display unit of the portable telephone device 1 or the personal computer 2.

FIG. 4B shows an example of the displayed list showing the names of stations and buildings 14 as the designated spot information in order of proximity to the destination point, the exit information 15 about the stations and buildings as the destination point direction information, and the distance information 16 indicating the distances from the exits of the stations and buildings to the destination point as the destination point direction information.

By looking at the list shown in FIG. 4B, a user can simultaneously recognize the names of the stations, the names of the lines, the names of the exits of the stations, and the distances from the exits of the stations to the destination point.

In the exemplified case shown in FIG. 4B, the name of Tokyo station, which is the station nearest to AB corporation, and the name of the Yaesu south exit that is an exit of Tokyo station as the nearest station to AB corporation are displayed at the top of the list on the display unit. Also, the distance from the Yaesu south exit of Tokyo station to AB corporation is displayed on the display unit of the portable telephone device 1 or the personal computer 2.

The name of Kyobashi station that is the station second nearest to AB corporation, and No. 7 exit that is an exit of Kyobashi station second nearest to AB corporation are displayed on the second row in the list displayed on the display unit. Also, the distance from No. 7 exit of Kyobashi station to AB corporation is displayed on the display unit of the portable telephone device 1 or the personal computer 2.

The name of Takaracho station that is the station third nearest to AB corporation, and the A6 exit that is an exit of Takaracho station third nearest to AB corporation are displayed on the third row in the list displayed on the display unit. Also, the distance from the A6 exit of Takaracho station to AB corporation is displayed on the display unit of the portable telephone device 1 or the personal computer 2.

When a user operates the input unit of the portable telephone device 1 or the personal computer 2 to select a name of a station exit from the list showing the names of the stations, the names of the lines, the names of the station exits, and the distances from the station exits to the destination point shown in FIG. 4B, the distribution server 4 further extracts the photograph information as to the point corresponding to the selected name of the station exit from the photograph database 6.

For example, when the Yaesu south exit of Tokyo station is selected, the distribution server 4 extracts the photograph of the Yaesu south exit from the photograph database 6.

As shown in FIG. 5A, there are several streets continuing to the Yaesu south exit. In this case, the distribution server 4 selects the street nearest to AB corporation. The distribution server 4 then extracts the photograph information as to the streets nearest to AB corporation taken at the Yaesu south exit, from the photograph database 6.

The distribution server 4 then adds direction-indicating symbol information 17 such as an arrow indicating the direction toward AB corporation, to the street leading to AB corporation captured in the extracted photograph information.

In this manner, an image showing the name of AB corporation as the destination, and the arrow as the display information indicating the direction toward AB corporation from the Yaesu south exit of Tokyo station as the destination point direction information shown on the street on the route to the destination is added to the surrounding area information shown in FIG. 4A, and is displayed on the display unit of the portable telephone device 1 or the personal computer 2.

FIG. 5B shows a photograph having direction information 18 attached to the street leading to AB corporation from the Yaesu south exit. The photograph having the direction information 18 inserted thereto is displayed on the display unit of the portable telephone device 1 or the personal computer 2, transmitted from the distribution server 4 via the communication network 5.

The symbol information 17 in FIG. 5A and the direction information 18 in FIG. 5B indicate the same direction on the same street.

For example, in the case of the portable telephone device 1, a user at the Yaesu south exit can easily recognize the street leading to AB corporation from the Yaesu south exit by looking at the photograph having the direction information displayed on the display unit of the portable telephone device 1. Also, the user can instantly recognize in which direction to go on the recognized street.

The distribution server 4 further associates the photograph information having the direction information 18 inserted thereto with the surrounding area information indicating AB corporation and Tokyo station, and the symbol information 17 such as an arrow indicating the same direction as the direction information 18 inserted to the photograph information. The arrow or the like as the symbol information 17 shown in FIG. 5A indicates the direction from the Yaesu south exit, which is the exit nearest to AB corporation among the exits of Tokyo station. The distribution server 4 then stores the photograph information in the processed image storage server 3.

When a user sends a transmission request by operating the input unit of the portable telephone device 1 or the personal computer 2, the distribution server 4 transmits the surrounding area information showing the direction information 17 such as an arrow and the photograph information that has the direction information 18 inserted thereto and is associated with the surrounding area information, to the portable telephone device 1 or the personal computer 2.

Upon receipt of the surrounding area information of FIG. 5A showing the symbol information 17 such as an arrow and the photograph information of FIG. 5B having the direction information 18 inserted thereto, the portable telephone device 1 or the personal computer 2 might display the images shown in FIGS. 5A and 5B at the same time, or might display the images shown in FIGS. 5A and 5B one by one.

In a case where the images shown in FIGS. 5A and 5B are displayed simultaneously on the display unit of the portable telephone device 1, the user can check the destination and the exits of stations and the likes on the map according to the surrounding area information. While checking the street leading to the destination from an exit according to the photograph information having the direction information 18 inserted thereto, the user can see the view from the actual exit, and easily find the street captured in the photograph information.

In a case where the images shown in FIGS. 5A and 5B are displayed one by one on the portable telephone device 1, the user can easily find the street leading to the destination by looking at the images alternately.

Further, with the use of the personal computer 2, the images shown in FIGS. 5A and 5B can be printed out in advance through a printing device such as a printer. In this manner, the user can check the printout at the exit of the station or the like, and can easily find the street leading to the destination from the exit of the station or the like.

The images shown in FIGS. 5A and 5B are associated with each other and are stored in the processed image storage server 3. Likewise, the surrounding area information that is generated by the distribution server 4 about the surrounding area from the exits of stations and the likes to the destination and has the symbol information 17 such as an arrow attached to the street leading to the destination from the exits of stations and the likes is associated with the photograph information that has the direction information 18 such as an arrow attached to the street leading to the destination and is formed by capturing the street leading to the destination from the exits of stations and the likes. The surrounding area information and the photograph information associated with each other are also stored in the processed image storage server 3.

URLs (Uniform Resource Locations) may be allotted to the surrounding area information and the photograph information associated with each other. In this manner, it is possible to access the surrounding area information and the photograph information directly from the portable telephone device 1 or the personal computer 2 via the communication networks 5, and it is also possible to access the surrounding area information and the photograph information via the distribution server 4.

For example, when a user wishes to have the images of FIGS. 5A and 5B displayed on the display unit of the portable telephone device 1 outside the home, the user inputs the URLs to the input unit of the portable telephone device 1, so as to have the images of FIGS. 5A and 5B displayed on the display unit of the portable telephone device 1 via the communication network 5, directly from the processed image storage server 7, or via the distribution server 4.

Referring now to FIG. 6, a flowchart showing an operation in accordance with this embodiment is described.

FIG. 6 shows the procedures of steps S1 through S3 related to an operation to be performed by a user who uses the portable telephone device 1, the procedures of steps S4 through S10 to be carried out by the distribution server 4, the photograph database 6, and the map database 7 in response to the procedures of steps 1 through 3, and the procedures of steps S11 through S13 related to changes of images to be displayed on the display unit of the portable telephone device 1.

The user in the case of FIG. 6 is in a train and is using the portable telephone device 1 to search for the location of the Tokyo Yaesu branch of AB corporation.

In step S1, the user operates the input unit of the portable telephone device 1, to put the portable telephone device 1 into a map search mode. The user then inputs "the Tokyo Yaesu branch of AB corporation" as the search target point. The operation then moves on to step S2.

In step S2, the display unit of the portable telephone device 1 displays the surrounding area map that has solid squares representing exits of the nearest stations to the Tokyo Yaesu branch of AB corporation as the destination shown in FIG. 4A: the Yaesu south exit of Tokyo station, No. 7 exit of Kyobashi station, and A6 exit of Takaracho station (the same image as the image to be displayed in step S11 during an operation of the display screen). To have the image of FIG. 4B showing the list of the nearest stations (the same image as the image to be displayed in step S12 during the operation of the display screen) displayed on the display unit, the user selects the next image on the input unit. The operation then moves on to step S3.

In step S3, the user operates the input unit of the portable telephone device 1 to select the Yaesu south exit of Tokyo station, which is an exit of the station nearest to the Tokyo Yaesu branch of AB corporation, from the image displayed in step S12.

As a result, the surrounding area information and the photograph showing the street leading to the Tokyo Yaesu branch of AB corporation from the Yaesu south exit of Tokyo station shown in FIGS. 5A and 5B, respectively, are displayed on the display unit of the portable telephone device 1.

Next, the procedures of steps S4 through S10 to be carried out by the distribution server 4, the photograph database 6, and the map database 7 in response to the procedures of steps S1 through S3 are described.

In step S4, the distribution server 4 searches the map database 7 for the destination that is input by the user in step S1. After extracting the surrounding area map related to the destination from the map database 7, the distribution server 4 edits the surrounding area map so that the symbol representing the Tokyo Yaesu branch of AB corporation and the solid square symbols representing the Yaesu south exit of Tokyo station, No. 7 exit of Kyobashi station, and A6 exit of Takaracho station, which are the stations nearest to the Tokyo Yaesu branch of AB corporation, are superimposed on the surrounding area map. The distribution server 4 then causes the portable telephone device 1 of the user to display the edited surrounding area map.

In step S5, the distribution server 4 prioritizes the information about the stations nearest to the Tokyo Yaesu branch of AB corporation in order of proximity to the Tokyo Yaesu branch of AB corporation. The distribution server 4 then causes the portable telephone device 1 of the user to display the prioritized information.

In step S6, the distribution server 4 uses the map database 7 to calculate the route from the Yaesu south exit of Tokyo station selected by the user in step S3 to the Tokyo Yaesu branch of AB corporation as the destination.

In step S7, the distribution server 4 acquires node information about a node on the route to the Tokyo Yaesu branch of AB corporation, with the node information being associated with the Yaesu south exit of Tokyo station.

In step S8, the X-coordinate information (x1) and the Y-coordinate information (y1) of the node information acquired in step S7 are obtained. The X-coordinate information and the Y-coordinate information may be the latitude and longitude information, or may be the X-coordinate and the Y-coordinate based on a predetermined map. The operation then moves on to step S9.

In step S9, the photograph information as to the photograph closest to the point defined by the X-coordinate information (x1) and the Y-coordinate information (y1) obtained in step S8 is extracted from the photograph database 6. The extracted photograph is a photograph of the street leading to the destination from an exit of a station or the like. Therefore, the distribution server 4 edits the photograph so that a symbol such as an arrow indicating the direction toward the destination is displayed on the street leading to the destination. The operation then moves on to step S10.

In step S10, the surrounding area map including the photograph extracted and edited in step S9 and the destination is transmitted to the portable telephone device 1 of the user. Accordingly, the surrounding area map including the photograph extracted and edited in step S9 and the destination to be displayed in step S13 is displayed on the display unit of the portable telephone device 1 of the user.

Next, the display image to be displayed on the display unit of the portable telephone device 1 is described.

In step S11, the surrounding area map of the destination as a result of the search conducted by the distribution server in step S4 on the map database 7 to search for the destination is displayed. The symbol representing the Tokyo Yaesu branch of AB corporation and the solid square symbols representing the Yaesu south exit of Tokyo station, No. 7 exit of Kyobashi station, and A6 exit of Takaracho station, which are the stations nearest to the Tokyo Yaesu branch of AB corporation, are superimposed on the surrounding area map, and are also displayed.

In step S12, the information about the stations nearest to the Tokyo Yaesu branch of AB corporation extracted by the distribution server 4 in step S5 is displayed on the display unit of the portable telephone device 1, based on the priority order that is set by the distribution server 4 in order of proximity to the Tokyo Yaesu branch of AB corporation.

In step S13, the display unit of the portable telephone device 1 displays the photograph that is extracted from the photograph database 6 and is edited by the distribution server 4 in step S10 based on the exit of the station selected by the user in step S3, and the surrounding area map including the symbol that represents the destination and the arrow that indicates the direction from the station exit toward the destination and is attached onto the street continuing to the station exit.

The flowchart of FIG. 6 may be recorded on a recording medium such as a flexible disk in advance, or may be recorded via a network such as the Internet in advance. By reading and executing the recorded program with a general-purpose microcomputer or the like, the general-purpose microcomputer may function as a CPU in accordance with this embodiment.

In the above embodiment, a user searches for a street leading to a destination at an exit of the station nearest to the destination. However, the present invention is not limited to such a case.

For example, a user might become lost while walking toward a destination from an exit of the station nearest to the destination. In such a case, a route search may be carried out at an intersection, with the use of a portable telephone equipped with a GPS (Global Positioning System). A route from the intersection to the destination is then searched. At the intersection linked to the route, photographs are taken in directions away from the intersection so that all the streets connected to the intersection are captured in the photographs, and the photographs are stored in the photograph database 6, as described with reference to FIG. 2B and FIG. 3.

Accordingly, the distribution server 4 extracts, from the photograph database 7, the photograph information taken in a direction toward the destination from the intersection at which the user is located. The distribution server 4 then edits image information (image information including photograph information), so that a symbol such as an arrow indicating the direction toward the destination is added to the photograph information. The distribution server 4 transmits the edited image information to the portable telephone device held by the user.

By looking at the display unit of the portable telephone device, the user can check the image information including the photograph information transmitted from the distribution server 4. The user then compares the street at the intersection that has the symbol such as an arrow attached thereto and is displayed on the display unit of the portable telephone device 1 with the actual view at the intersection. In this manner, the user can recognize the street leading to the destination.

As described above, the user can have a look at the photograph information about the street leading to the destination from the intersection on the portable telephone device via the distribution server 4. Thus, the user can be prevented from becoming lost.

Furthermore, the photograph information about the street leading to the destination is associated with the surrounding area information to which a symbol such as an arrow indicating the direction toward the destination from an exit of the station nearest to the destination is added. The photograph information and the surrounding area information associated with each other are stored in the processed image storage server 3. Accordingly, on various occasions, the user can make good use of the photograph information and the surrounding area information associated with each other.

For example, FIG. 7A shows a surrounding area map in which an arrow indicating the direction toward a user's home is superimposed on the street leading to the user's home from an exit of the station nearest to the user's home. FIG. 7B is a photograph that is taken at a point 19 in FIG. 7A in the direction of an arrow 21 indicating the direction toward the user's home, so that a street 20 is captured in the photograph. Like the arrow 21 in FIG. 7A, the arrow 22 shown in FIG. 7B indicates the direction toward the user's home as the destination. The images of FIGS. 7A and 7B are associated with each other and are stored in the processed image storage server 3. The distribution server 4 allots URLs to the images of FIGS. 7A and 7B.

In this case, the user uses a portable telephone device to transmit the URLs of the images of FIGS. 7A and 7B to a person who is about to visit the user's home.

When arriving at the point 19 as the nearest station in FIG. 7A, the person who is about to visit the user's home uses a portable telephone device to transmit the URLs to the distribution server 4 or the processed image server 3. As a result, the images of FIGS. 7A and 7B are displayed on the display unit of the portable telephone device of the person visiting the user's home.

At the point 19 in FIG. 7A, the person visiting the user's home can easily find the street 20 leading to the user's home by looking at the image of FIG. 7B displayed on the display unit of the portable telephone device. Thus, the person visiting the user's home does not become lost.

Although the photograph database 6 and the map database 7 are employed in this embodiment, it is also possible to store a part of the information to be stored in those databases into a storage unit of an information terminal device such as the portable telephone device 1. Also, the operations performed by the distribution server 4 may be performed by an operating device unit (not shown) of an information terminal device such as the portable telephone device 1. More specifically, the operating device unit of an information terminal device can extract surrounding area information and photograph information from a storage unit of the information terminal device, add symbol information such as an arrow indicating the direction toward the destination to the surrounding area information and the photograph information, and display the surrounding area information and the photograph information including the symbol information such as the arrow indicating the direction toward the destination.

As described above, in this embodiment, a user at an exit of a station looks at photograph information that is taken to capture the street extending to the destination from the exit of the station. In this manner, the user recognizes the street leading to the destination, and does not become lost on the way to the destination.

A user looks at a map and a photograph of the area surrounding the destination displayed on the display unit of an information terminal device such as a portable telephone device or a personal computer. In this manner, the user can easily grasp the positional relationships between the destination and designated spots such as the stations near the destination.

For example, when a portable telephone device is used, the user at an exit of a station can easily recognize the street leading to the destination from the exit of the station, by looking at a photograph including direction information displayed on the display unit of the portable telephone device. Also, by virtue of the direction information, the user can instantly understand in which direction he/she should walk on the street.

Also, URLs are allotted to surrounding area information and photograph information associated with each other, and the surrounding area information and the photograph information associated with each other are stored in an information processing device such as a server. With this arrangement, it is possible to access the surrounding area information and the photograph information associated with each other directly from an information terminal device such as a portable telephone device or a personal computer through a communication network. Thus, anyone can easily find the street leading to a destination.

For example, a user who is out of home can have surrounding area information and image information displayed on the display unit of a portable telephone device, with the surrounding area information indicating a destination and a symbol representing the street leading to the destination from an exit of the nearest station, the image information being formed by image-capturing the street leading to the destination from the exit of the station and adding an arrow representing the direction toward the destination to the street. Accordingly, the street leading to the destination can be readily found.

With this arrangement, the user can check the destination and an exit of a station or the like on the map as the surrounding area information displayed on the display unit of the portable telephone device. While checking the street leading to the destination from the exit on the photograph information having direction information inserted thereto, the user can look at the actual view from the exit, and easily find the street captured in the photograph information.

Further, with the use of a printing machine, the surrounding area information and the photograph information having the direction information inserted thereto may be printed out in advance. With this arrangement, the user can look at the printout at the exit of the station or the like, and easily find the street leading to the destination from the exit of the station or the like.

Also, surrounding area information and photograph information that are associated with each other and have URLs allotted thereto may be transmitted beforehand to a person who is about to visit a destination. In this case, when arriving at an exit included in the surrounding area information, the person to go to the destination uses an information terminal device such as a portable telephone device to transmit the URLs. In this manner, the surrounding area information and the photograph information associated with each other can be readily displayed on the display unit of the information terminal device. As a result, the person can easily find the street captured in the photograph information, while seeing the actual view from the exit.

The invention claimed is:

1. An information terminal device which transmits and receives information to and from a server device via a network, comprising:
   an input device which inputs destination information indicative of a destination by a user,
   a transmitting device which transmits the inputted destination information to the server device,
   a receiving device which receives, from the server device, image information indicative of a three-dimensional image viewed from a station exit of public transportation, and
   a display device which displays the received image information,
   wherein the receiving device receives the image information indicative of the three-dimensional image which includes a road directed to the destination among a plurality of roads connected to a station exit in a surrounding area of the destination designated by the destination information, and in which an arrow indicative of a direction to the destination is superimposed on the road, and
   the display device displays the received image information indicative of the three-dimensional image in a case where a present position is at the station exit in the surrounding area of the destination, and
   wherein the three-dimensional image is an image indicative of a direction away from the station exit along the road from one of a plurality of positions in proximity to the station exit which correspond to a plurality of the roads connected to the station exit, the image being associated with one of a plurality of the positions, and
   the receiving device receives the image information indicative of the three-dimensional image associated with a position which a road directed to the destination includes, and wherein the three-dimensional image is an image which directs a user from the station exit to the destination.

2. An information terminal device according to claim 1, wherein the image information indicative of the three-dimensional image is photograph information.

3. A method for controlling an information terminal device which transmits and receives information to and from a server device via a network, comprising:
   inputting destination information indicative of a destination by a user,
   transmitting the inputted destination information to the server device,
   receiving, from the server device, image information indicative of a three-dimensional image viewed from a station exit of public transportation, and
   displaying the received image information,
   wherein the receiving the image information indicative of the three-dimensional image viewed from the station exit of public transportation comprises receiving the image information indicative of the three-dimensional image which includes a road directed to the destination among a plurality of roads connected to a station exit in a surrounding area of the destination designated by the destination information, and in which an arrow indicative of a direction to the destination is superimposed on the road, and the displaying comprises displaying the received image information indicative of the three-dimensional image in a case where a present position is at the station exit in the surrounding area of the destination, and wherein the three-dimensional image is an image indicative of a direction away from the station exit along the road from one of a plurality of positions in proximity to the station exit which correspond to a plurality of the roads connected to the station exit, the image being associated with one of a plurality of the positions, and receiving the image information indicative of the three-dimensional image associated with a position which a road directed to the destination includes, and wherein the three-dimensional image is an image which directs a user from the station exit to the destination.

4. A non-transitory computer-readable recording medium where a program for controlling an information terminal device which transmits and receives information to and from a server device via a network is recorded, the program causing a computer in the information terminal device to function as:

an input device which inputs destination information indicative of a destination by a user, a transmitting device which transmits the inputted destination information to the server device, a receiving device which receives, from the server device, image information indicative of a three-dimensional image viewed from a station exit of public transportation, and a display device which displays the received image information, wherein the receiving device receives the image information indicative of the three-dimensional image which includes a road directed to the destination among a plurality of roads connected to a station exit in a surrounding area of the destination designated by the destination information, and in which an arrow indicative of a direction to the destination is superimposed on the road, and the display device displays the received image information indicative of the three-dimensional image in a case where a present position is at the station exit in the surrounding area of the destination, and wherein the three-dimensional image is an image indicative of a direction away from the station exit along the road from one of a plurality of positions in proximity to the station exit which correspond to a plurality of the roads connected to the station exit, the image being associated with one of a plurality of the positions, and the receiving device receives the image information indicative of the three-dimensional image associated with a position which a road directed to the destination includes, and wherein the three-dimensional image is an image which directs a user from the station exit to the destination.

* * * * *